United States Patent
Satyanarayana et al.

(10) Patent No.: US 10,779,340 B2
(45) Date of Patent: Sep. 15, 2020

(54) DYNAMIC ANCHORING OF WIRELESS DEVICES TO A DESIGNATED WIRELESS CONTROLLER

(71) Applicant: Cisco Technology, Inc., San Jose, CA (US)

(72) Inventors: Mahesh Satyanarayana, Santa Clara, CA (US); Chethan Channappa, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/012,357

(22) Filed: Jun. 19, 2018

(65) Prior Publication Data
US 2019/0387556 A1    Dec. 19, 2019

(51) Int. Cl.
| | |
|---|---|
| *H04W 76/12* | (2018.01) |
| *H04W 28/18* | (2009.01) |
| *H04W 48/12* | (2009.01) |
| *H04W 88/12* | (2009.01) |
| *H04W 84/12* | (2009.01) |
| *H04W 72/04* | (2009.01) |

(52) U.S. Cl.
CPC ........... *H04W 76/12* (2018.02); *H04W 28/18* (2013.01); *H04W 48/12* (2013.01); *H04W 88/12* (2013.01); *H04W 72/042* (2013.01); *H04W 84/12* (2013.01)

(58) Field of Classification Search
CPC ..... H04W 76/12; H04W 88/12; H04W 28/18; H04W 48/12; H04W 72/042; H04W 84/12
See application file for complete search history.

(56) References Cited

U.S. PATENT DOCUMENTS

| | | |
|---|---|---|
| 9,848,378 B2 | 12/2017 | Anpat et al. |
| 2017/0006135 A1 | 1/2017 | Siebel et al. |
| 2017/0155703 A1 | 6/2017 | Hao et al. |
| 2017/0195288 A1* | 7/2017 | Libby .............. H04W 12/06 |
| 2017/0279682 A1 | 9/2017 | Dawson et al. |
| 2018/0020392 A1* | 1/2018 | Eller ................ H04W 4/44 |
| 2019/0059024 A1* | 2/2019 | Mufti .............. H04W 28/18 |

OTHER PUBLICATIONS

Solution Brief, "Developing and Deploying Strong IoT Security," 2016, 3 pages.
Cisco Wireless LAN Contoller Configuration Guide, Release 7.0. 116.0; 32 pages.
Cisco Guest Access using WLC with Anchor Setup—Release 7.0, 18 pages. accessed online Feb. 21, 2018.
Cisco Wireless Controller Configuration Guide, Release 7.5, "Configuring Dynamic Anchoring for Clients with Static IP Addresses," 4 pages.

* cited by examiner

*Primary Examiner* — Walter J Divito
(74) *Attorney, Agent, or Firm* — Patterson + Sheridan, LLP (57) ABSTRACT

Systems, methods, and computer program products relating to anchoring a wireless device to a wireless controller. A type of a network device is identified based on data included in a network message received at a first wireless local area network (LAN) controller (WLC). It is determined, based on the identified type, that the network device should be anchored to a pre-determined anchor WLC. An anchor request message is transmitted from the first WLC to the pre-determined anchor WLC. A network traffic tunnel is established between the network device and the pre-determined anchor WLC such that network traffic from the network device can be controlled by the pre-determined anchor WLC.

20 Claims, 8 Drawing Sheets

DYNAMIC ANCHORING OF WIRELESS DEVICES TO A DESIGNATED WIRELESS CONTROLLER

TECHNICAL FIELD

Embodiments presented in this disclosure generally relate to anchoring wireless devices to a wireless controller.

BACKGROUND

Internet of Things (IoT) devices can connect to an enterprise or campus wireless network via a WiFi Access Point (AP) and Wireless Local Area Network (LAN) Controller (WLC). These APs and WLCs provide network connectivity to IoT devices, just as they provide connectivity to other wireless devices, like computers and smartphones. IoT devices, however, may be physically located across a wide area of an enterprise or campus, resulting in different WLCs servicing the different IoT devices. Further, in some wireless networks, APs themselves may provide uplink network access to IoT devices, so that data traffic does not even reach a WLC.

This broad distribution of IoT devices across different WLCs can pose problems in managing network policies for IoT devices. Network administrators may want to configure and apply IoT device specific security policies on each WLC that may service an IoT device. But this is very difficult, or impossible, if the IoT devices are spread across multiple WLCs throughout an enterprise or campus network.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A and 4Bb are an illustration of associating an IoT device with an anchor WLC while the IoT device is connected to a wireless network, according to embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Embodiments described herein include a method for anchoring a wireless device to a wireless controller. The method includes identifying a type of a network device based on data included in a network message received at a first wireless local area network (LAN) controller (WLC). The method further includes determining, based on the identified type, that the network device should be anchored to a pre-determined anchor WLC. The method further includes transmitting an anchor request message from the first WLC to the pre-determined anchor WLC. The method further includes establishing a network traffic tunnel between the network device and the pre-determined anchor WLC such that network traffic from the network device can be controlled by the pre-determined anchor WLC.

Embodiments described herein further include a computer program product for anchoring a wireless device to a wireless controller. The computer program product includes a computer-readable storage medium having computer-readable program code embodied therewith. The code, when executed by a processor, performs an operation. The operation includes identifying a type of a network device based on data included in a network message received at a first wireless local area network (LAN) controller (WLC). The operation further includes determining, based on the identified type, that the network device should be anchored to a pre-determined anchor WLC. The operation further includes transmitting an anchor request message from the first WLC to the pre-determined anchor WLC. The operation further includes establishing a network traffic tunnel between the network device and the pre-determined anchor WLC such that network traffic from the network device can be controlled by the pre-determined anchor WLC.

Embodiments described herein further include a system. The system includes a processor and a memory storing a program, which, when executed on the processor, performs an operation. The operation includes identifying a type of a network device based on data included in a network message received at a first wireless local area network (LAN) controller (WLC). The operation further includes determining, based on the identified type, that the network device should be anchored to a pre-determined anchor WLC. The operation further includes transmitting an anchor request message from the first WLC to the pre-determined anchor WLC. The operation further includes establishing a network traffic tunnel between the network device and the pre-determined anchor WLC such that network traffic from the network device can be controlled by the pre-determined anchor WLC.

Example Embodiments

Instead of IoT devices being spread across numerous WLCs throughout a network, it is desirable to associate IoT devices with a single anchor WLC (or a small number of anchor WLCs). This allows network administrators to manage IoT devices scattered across enterprise or campus networks at a single point or small group of points. In an embodiment, IoT traffic can be tunneled to the anchor WLC(s), and so a network administrator can control the IoT devices by controlling this anchor WLC.

Further, the IoT devices can be associated with an anchor WLC (or WLCs) at several different points in time. For example, in an embodiment, the IoT devices can be associated with an anchor WLC upon connection with an AP. Alternatively, a network device (e.g., a WLC) could monitor network traffic from the IoT devices and associate the IoT devices with the anchor WLC after the network connection has been established. Further, existing message types can be leveraged to provide this functionality, or new message types can be created.

Figure 1:
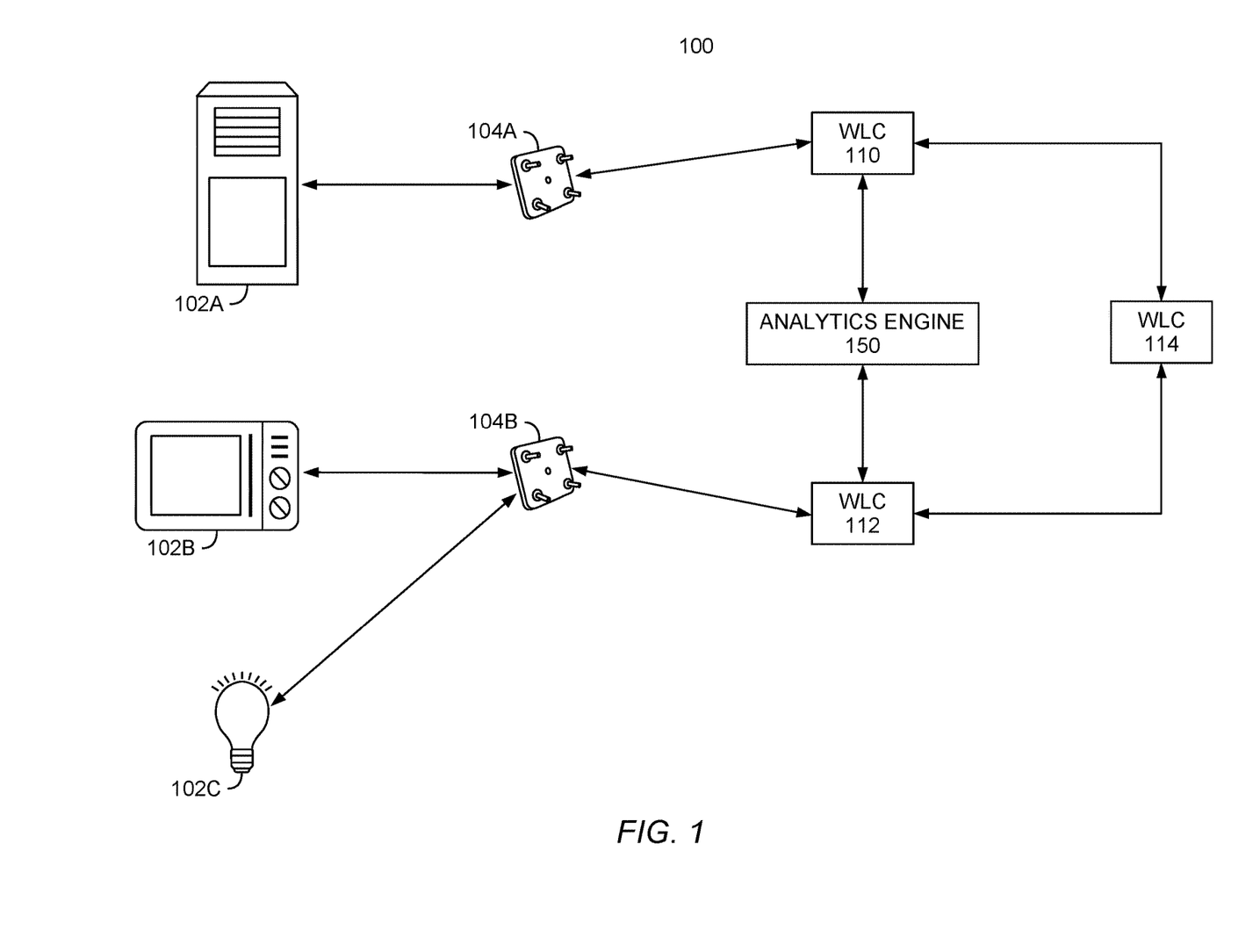
FIG. 1 is an illustration of a system in which a plurality of IoT devices can be associated with an anchor WLC, according to embodiments.

FIG. 1 is an illustration of a system 100 in which a plurality of IoT devices can be associated with an anchor WLC, according to embodiments. The system 100 includes the IoT devices 102a, 102b, and 102c. As illustrated in FIG. 1, the IoT device 102a is a smart refrigerator, the IoT device 102b is a smart microwave, and the IoT device 102c is a smart light bulb. But these are merely examples. The system could include any suitable IoT device, and any number of IoT devices.

Further, the illustrated embodiments focus on association of IoT devices with an anchor WLC. A person of ordinary skill in the art would understand, however, that the embodiments disclosed herein could be applied to any suitable type of wireless device, instead of (or in addition to) IoT devices. For example, a network administrator might wish to anchor a particular type of device at a single WLC or group of WLCs. Embodiments herein illustrate associating an anchor WLC with these devices.

The IoT device 102a is connected to the AP 104a for wireless network access. The IoT devices 102b and 102c are connected to the AP 104b. For example, the APs 104a and 104b could be located in different buildings, different rooms, or different parts of a room. The IoT devices can connect to their respective APs using well-known techniques. Each IoT device could, for example, connect to the AP that provides the highest quality wireless signal. The APs 104a and 104b can be any suitable wireless Access Point device.

The AP 104a is connected to WLC 110, while the AP 104b is connected to the WLC 112. The WLC 110 and the WLC 112 can be any suitable Wireless LAN Controller. As illustrated in FIG. 1, the IoT device 102a is controlled by WLC 110 while the IoT devices 102b and 102c are controlled by WLC 112. In the illustrated embodiment of FIG. 1, network communication to and from the IoT devices 102a-c flows through the WLCs 110 and 112, respectively. In an alternative embodiment, the APs 104a and 104b can provide uplink network access for the IoT devices 102a-c, bypassing the WLCs 110 and 112.

In either case, it may be desirable to instead have all three IoT devices, 102a-c, controlled by a single WLC, for ease of network control and administration. This WLC can be pre-determined by, for example, a network administrator, and can be referred to as an anchor WLC. The WLCs 110 and 112 are connected to an analytics engine 150. As discussed in more detail with regard to FIGS. 3-6, the analytics engine 150 can be used to identify the type of the IoT devices 102a-c and facilitate association with the pre-determined anchor WLC 114. In an embodiment, the WLC 114 can be designated as an anchor WLC for the IoT devices 102a-c, and a tunnel can be established between the IoT devices 102a-c and the anchor WLC 114. For example, an Ethernet over IP (EoIP) tunnel could be created between the anchor WLC 114 and the IoT devices 102a-c. This is discussed in more detail with regard to FIGS. 3-6.

For example, in an embodiment, traffic from the AP 104a could be tunneled through the WLC 110 to the anchor WLC 114. The WLC 110 could act as a foreign controller, and an EoIP tunnel could be established from the WLC 110 to the anchor WLC 114. In this way, traffic from the IoT device 102a is managed and controlled by the anchor WLC 114, rather than WLC 110. In this embodiment, the same would be true of traffic from the IoT devices 102b and 102c—an EoIP tunnel could be established from the WLC 112 to the anchor WLC 114, and traffic from the IoT devices 102b and 102c would be managed and controlled by the anchor WLC 114. In another embodiment, other suitable network tunneling techniques could be used, such that traffic from the IoT device 102a is managed by the anchor WLC 114 instead of (or in addition to) the WLC 110).

In the embodiments illustrated in FIG. 1 and FIGS. 3-6, the anchor WLC 114 is illustrated as a single WLC. Alternatively, the anchor WLC 114 could be a small group of WLCs. Associating the IoT devices 102a-c with the anchor WLC 114 allows a network administrator to control network policies for all the IoT devices at a single point (or a small number of points). For example, the network administrator can control various security policies, ACLs, DHCP server configuration, DPI rules, Quality of Service policies, etc., for all IoT devices by configuring the anchor WLC 114.

Figure 2:
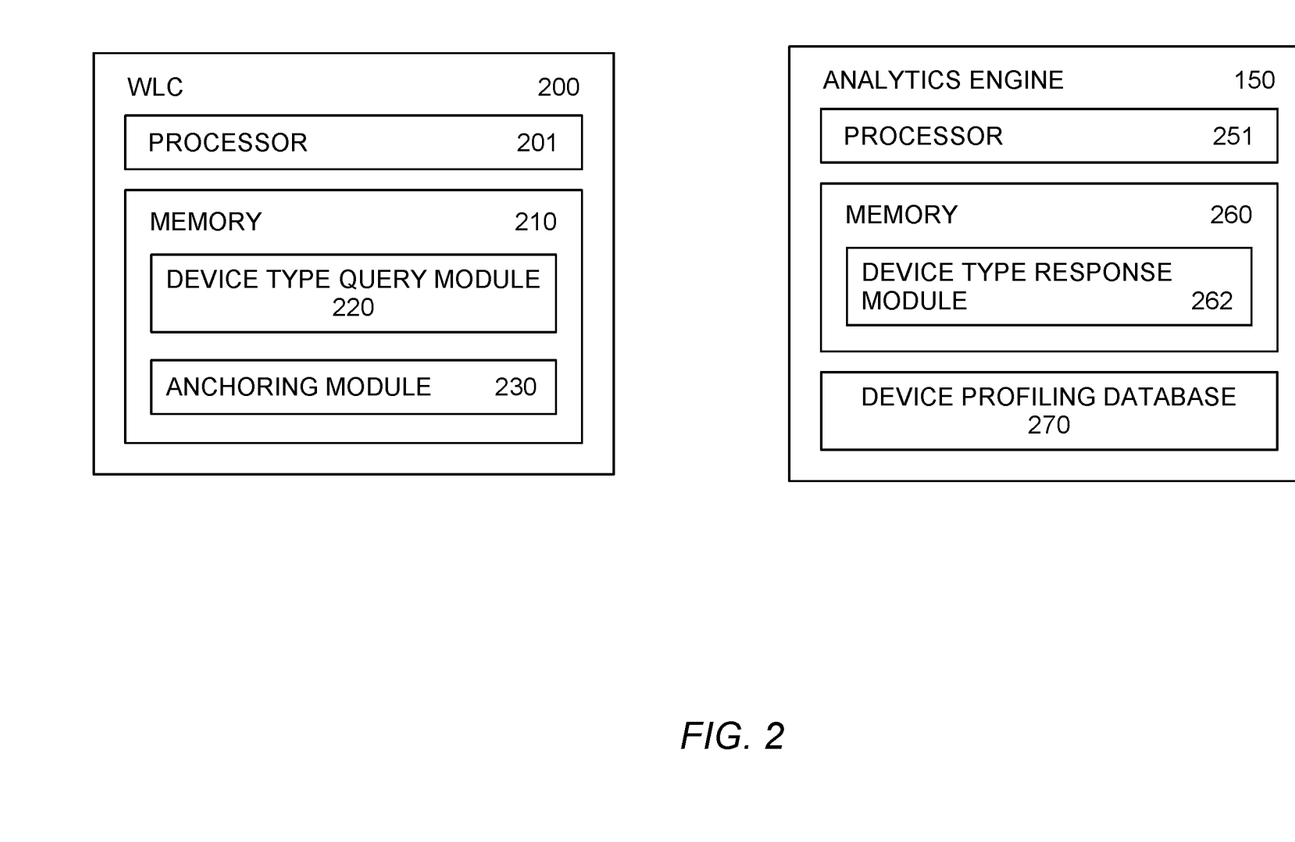
FIG. 2 is a block diagram illustrating a WLC and Analytics Engine with software modules for use in associating IoT devices with an anchor WLC, according to embodiments.

FIG. 2 is a block diagram illustrating a WLC 200 and Analytics Engine 150 with software modules for use in associating IoT devices with an anchor WLC, according to embodiments. The WLC 200 (e.g., WLCs 110, 112, and 114 illustrated in FIG. 1) includes a processor 201. The processor 201 generally retrieves and executes programming instructions stored in the memory 210. The processor 201 is included to be representative of a single central processing unit (CPU), multiple CPUs, a single CPU having multiple processing cores, graphics processing units (GPUs) having multiple execution paths, and the like. The memory 210 is generally included to be representative of electronic storage of any suitable type(s), including random access memory or non-volatile storage.

The memory 210 generally includes program code for performing various functions related to the WLC 200. The program code is generally described as various functional "applications," "components," or "modules" within the memory 210, although alternate implementations may have different functions and/or combinations of functions. The memory 210 includes modules suitable to allow the WLC 200 to act as a standard Wireless LAN Controller in a wireless network. In addition, the WLC 200 includes a device type query module 220. The device type query module 220 is generally configured to allow the WLC 200 to query an analytics engine (e.g., the analytics engine 150) for the type of a wireless device (e.g., is the device an IoT device or some other type of device). This is discussed in more detail with regard to FIGS. 3-6.

The WLC 200 further includes an anchoring module 230. The anchoring module 230 is generally configured to facilitate anchoring a device type (e.g., IoT devices) with a pre-designated anchor WLC or group of anchor WLCs. This can be done using, for example, a network tunnel (e.g., an EoIP tunnel), and is discussed in more detail with regard to FIGS. 3-6.

The analytics engine 150 is used, as discussed further with regard to FIGS. 3-6, to facilitate determining the type of wireless devices and anchoring the devices to an anchor WLC. In an embodiment, the analytics engine 150 can be an Identity Services Engine (ISE). In another embodiment, the analytics engine 150 can be a Digital Network Architecture Center (DNA-C). Alternatively, the analytics engine 150 can be any other suitable platform. The analytics engine 150 includes a processor 251. The processor 251 generally retrieves and executes programming instructions stored in the memory 260. The processor 251 is included to be representative of a single central processing unit (CPU), multiple CPUs, a single CPU having multiple processing cores, graphics processing units (GPUs) having multiple execution paths, and the like. The memory 260 is generally included to be representative of electronic storage of any suitable type(s), including random access memory or non-volatile storage.

The memory 260 generally includes program code for performing various functions related to the analytics engine 150. The program code is generally described as various functional "applications," "components," or "modules" within the memory 260, although alternate implementations may have different functions and/or combinations of functions. The memory 260 includes modules suitable to allow the analytics engine 150 to act as a standard analytics engine (e.g., modules suitable for a standard ISE or DNA-C) in a wireless network. In addition, the analytics engine 150 includes a device type response module 262. The device type response module 262 is generally configured to facilitate responding to a query from a WLC for the type of a wireless device (e.g., is the device an IoT device). The device type response module 262 can use a device profiling database 270 in this determination. The device profiling database 270 includes information sufficient for the device type response module 262 to determine the type of a particular wireless device. This is discussed in more detail with regard to FIGS. 3-6.

Figure 3:
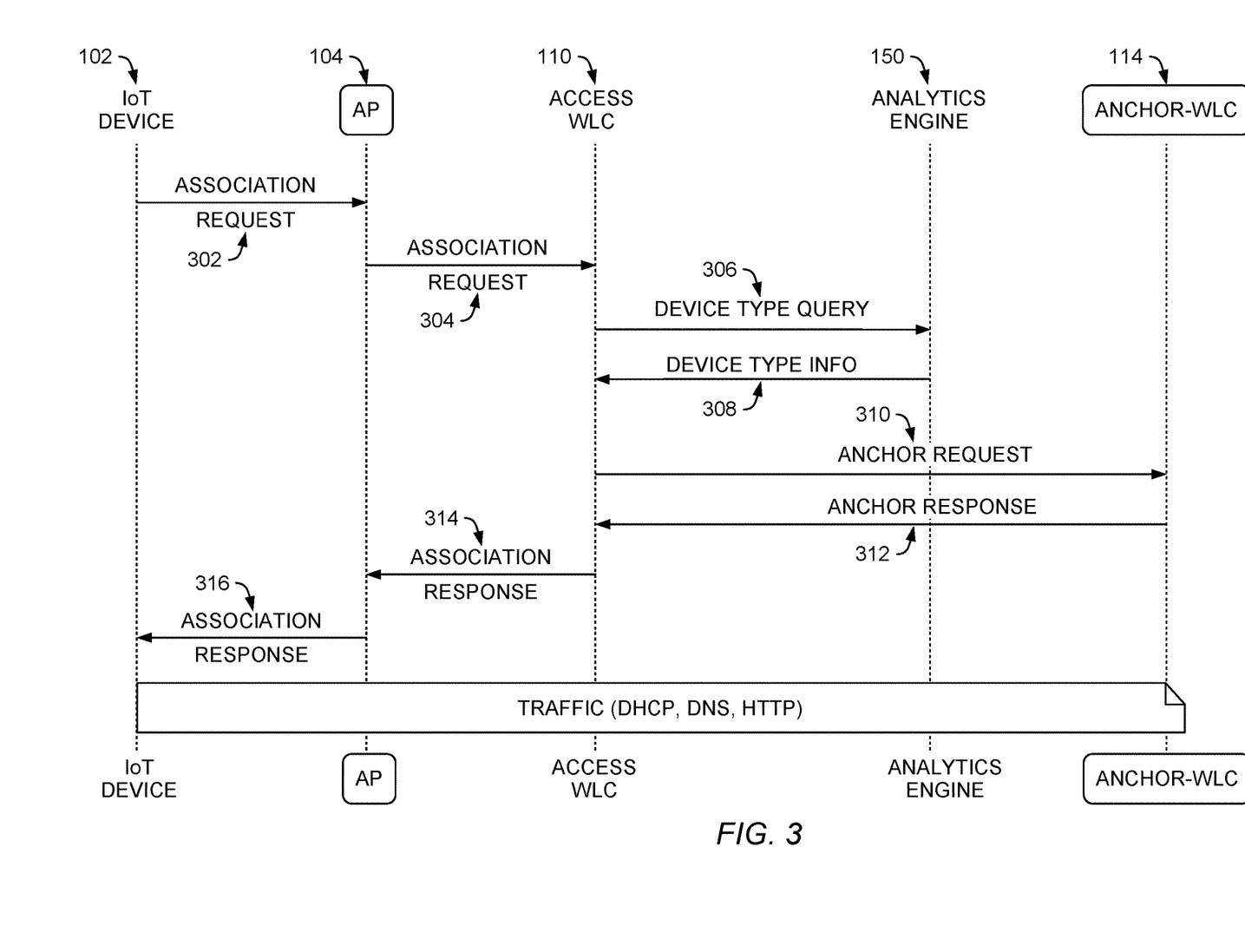
FIG. 3 is an illustration of associating an IoT device with an anchor WLC before the IoT device joins a wireless network, according to embodiments.

FIG. 3 is an illustration of associating an IoT device 102 with an anchor WLC 114 before the IoT device 102 joins a wireless network, according to embodiments. An IoT device 102 (e.g., IoT device 102a, 102b, or 102c illustrated in FIG. 1) sends an association request message 302 to an AP 104 (e.g., AP 104a or 104b illustrated in FIG. 1). In an embodiment, the destination AP 104 can be selected based on standard algorithms known to a person having ordinary skill in the art, and the association request message 302 can be a standard association request message. The AP 104 forwards the association request message 304 to the WLC 110 with which the AP 104 is associated. This WLC 110 can be referred to as the access WLC 110.

The access WLC 110 transmits a device type query message 306 to the analytics engine 150. In an embodiment, the device type query 306 is a Remote Procedure Call (RPC) for a designated Application Programming Interface (API). For example, the device type query 306 can be a JavaScript Object Notation (JSON) call to the analytics engine 150. In another embodiment, the device type query 306 can be included as part of an existing communication between the access WLC 110 and the analytics engine 150. For example, the device type query 306 could be an additional field in an existing message between the access WLC 110 and the analytics engine 150. Alternatively, the device type query 306 can be any suitable message from the access WLC 110 to the analytics engine 150 to request the device type for the IoT device 102. In an embodiment, the device type query message 306 can be generated and transmitted using the anchoring module 230 of WLC 200 illustrated in FIG. 2.

After receiving the device type query message 306, the analytics engine 150 determines the device type using metadata included in the device type query message 306. In an embodiment, the device type response module 262, illustrated in FIG. 2, can query the device profiling database 270 using metadata provided in the device type query message 306 (e.g., metadata related to the IoT device). The analytics engine 150 can then respond to the access WLC 110 with a device type info message 308 containing information about the device type for the IoT device 102. In an embodiment, this device type info message 308 can again be an RPC (e.g., a JSON call), an additional field in an existing communication between the analytics engine 150 and the access WLC 110, or any other suitable message.

The access WLC 110 receives and analyzes the device type info message 308. The access WLC 110 determines, using the device type info message 308, that the IoT device 102 is of an IoT type and should therefore be anchored to the anchor WLC 114. The access WLC 110 sends an anchor request message 310 to the anchor WLC 114. In an embodiment, this can be a standard message used to associate the IoT device 102 and the anchor WLC 114. Alternatively, the anchor request message 310 can be a proprietary message, or any other suitable message.

The anchor WLC 114 responds to the access WLC 110 with an anchor response message 312. Again, in an embodiment, this can be a standard message used to associate the IoT device 102 and the anchor WLC 114. Alternatively, the anchor response message 312 can be a proprietary message, or any other suitable message. The access WLC 110 then sends an association response message 314 to the AP 104. The AP 104 forwards the association response message 314 to the IoT device 102. After the IoT device 102 receives the association response message 316, network traffic from the IoT device 102 is tunneled to the anchor WLC 114 (e.g., by establishing an EoIP tunnel from the access WLC 110 to the anchor WLC 114). Network traffic related to the IoT device 102 can then be managed by a network administrator at the anchor WLC 114.

Figure 4A:
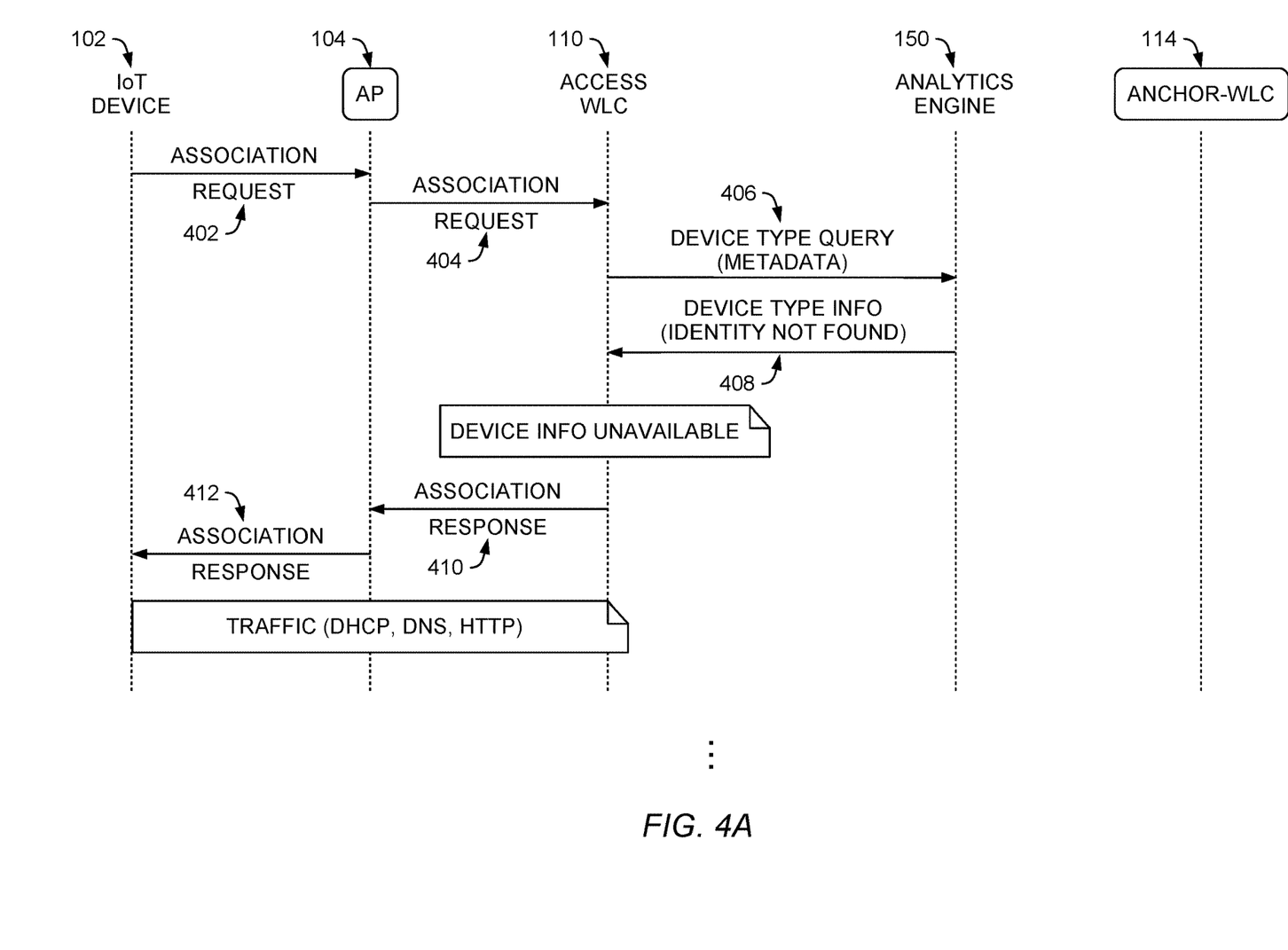
Figure 4B:
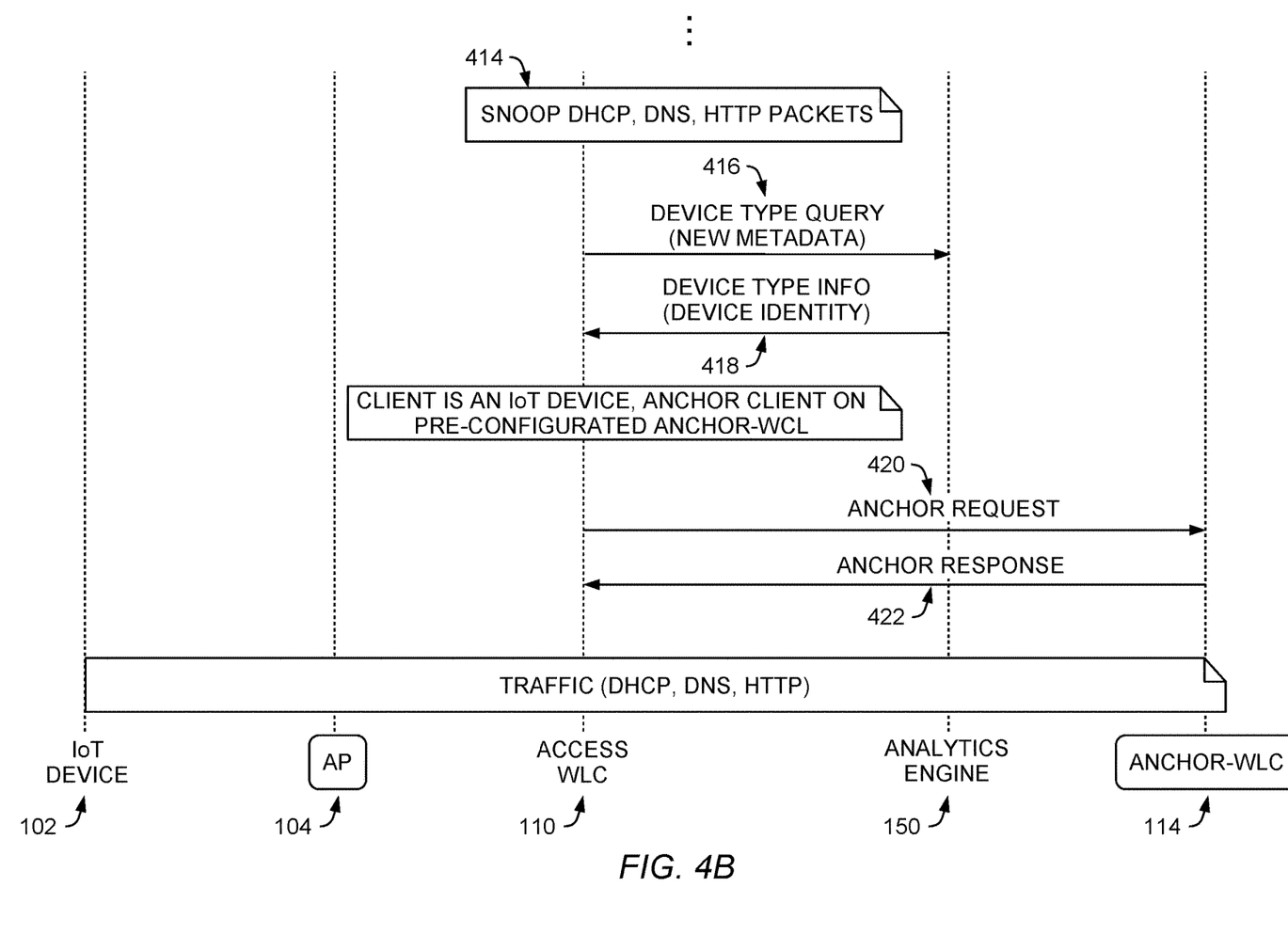

FIGS. 4A and 4B are an illustration of associating an IoT device 102 with an anchor WLC 114 while the IoT device 102 is connected to a wireless network, according to embodiments. This initial communications are similar to FIG. 3, discussed above, and further detail is provided in the discussion related to FIG. 3. An IoT device 102 (e.g., IoT device 102a, 102b, or 102c illustrated in FIG. 1) sends an association request message 402 to an AP 104 (e.g., AP 104a or 104b illustrated in FIG. 1). The AP 104 forwards the association request message 404 to the access WLC 110.

The access WLC 110 transmits a device type query message 406 to the analytics engine 150. In an embodiment, the device type query 406 includes metadata related to the IoT device 102, which the analytics engine 150 can use to identify the device type. In the illustrated embodiment of FIG. 4, the analytics engine 150 is unable to identify the device type, and so it responds to the access WLC 110 with a device type info message 408 indicating that the device could not be identified. This could occur for many different reasons. For example, the metadata transmitted in the device type query 406 could include an error, or could be insufficient to identify the IoT device 102 type. Alternatively, the device profiling database 270 in the analytics engine 150 may not include information necessary to identify the type of the IoT device 102.

Because the type of the IoT device 102 is not identified by the analytics engine 150, the access WLC 110 proceeds with a standard association process without anchoring the IoT device 102 to the anchor WLC 114. The access WLC 110 transmits an association response message 410 to the AP 104. The AP 104 sends the association response message 412 to the IoT device 102. At this point, the IoT device 102 is associated with the access WLC 110, and network traffic from the IoT device 102 flows to the access WLC 110.

While network traffic is flowing from the IoT device 102 to the access WLC 110, the access WLC 110 can identify the type of the IoT device 102 and anchor the IoT device 102 to the anchor WLC 114. For example, as illustrated in FIG. 4, the access WLC can snoop network traffic (e.g., DHCP, DNS, or HTTP packets) at block 414 and re-try the anchoring process. The access WLC 110 can send a new device type query message 416 to the analytics engine 150. In an embodiment, this device type query 416 can include additional metadata related to the IoT device 102. Alternatively, the device type query 416 can be the same as the device type query 406.

The device type query 416 could be triggered in many different situations. In one embodiment, the access WLC 110 could be configured to periodically poll the analytics engine 150 for the device type of the IoT device 102. In another embodiment, the access WLC 110 could be configured to repeatedly snoop DNS and/or DHCP packets for information suggesting that the device type query 416 should be sent. In another embodiment, the device type query 416 could be triggered whenever a new device is added to the access WLC 110 or a component of the wireless network. In an embodiment, the analytics engine 150 controls the snooping of packets by the access WLC 110, and triggers the device type query 416. In another embodiment, the access WLC 110 itself controls the snooping.

The analytics engine 150 sends a device type info message 418 to the access 110 identifying the device type for the IoT device 102 as an IoT device. Like the embodiment illustrated in FIG. 3, the access WLC 110 receives and analyzes the device type info message 418. The access WLC 110 determines, using the device type info message 418, that the IoT device 102 is of an IoT type and should therefore be anchored to the anchor WLC 114. The access WLC 110 sends an anchor request message 420 to the anchor WLC 114. The anchor WLC 114 responds to the access WLC 110 with an anchor response message 422, and the process proceeds as discussed above with regard to FIG. 3. After the IoT device 102 is associated with the anchor WLC 114, a tunnel is established so that network traffic from the IoT device 102 can be managed by the anchor WLC 114. For example, an EoIP tunnel can be established from the access WLC 110 to the anchor WLC 114.

Figure 5A:
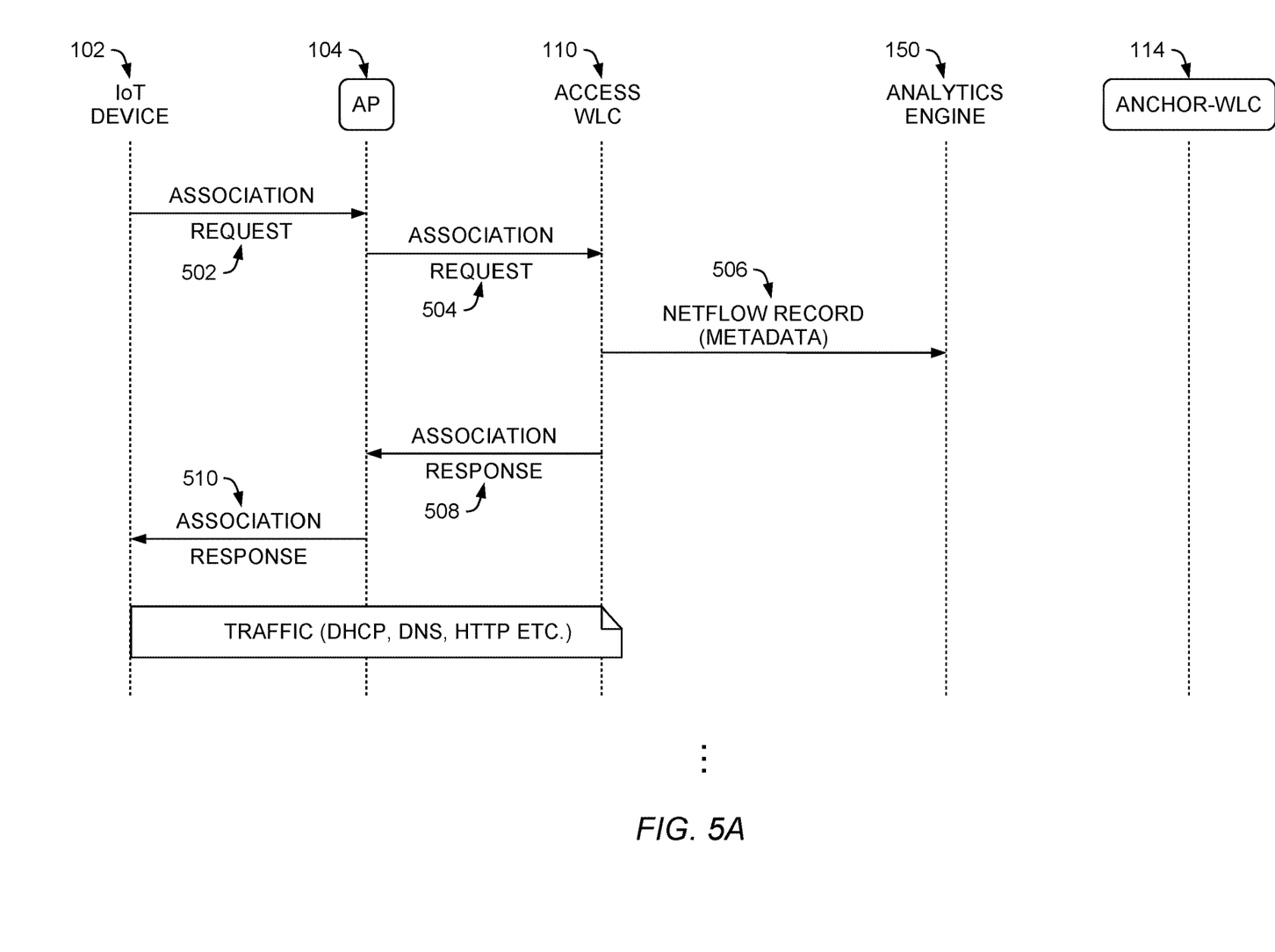
FIGS. 5A and 5B are a further illustration of associating an IoT device with an anchor WLC, according to embodiments.
Figure 5B:
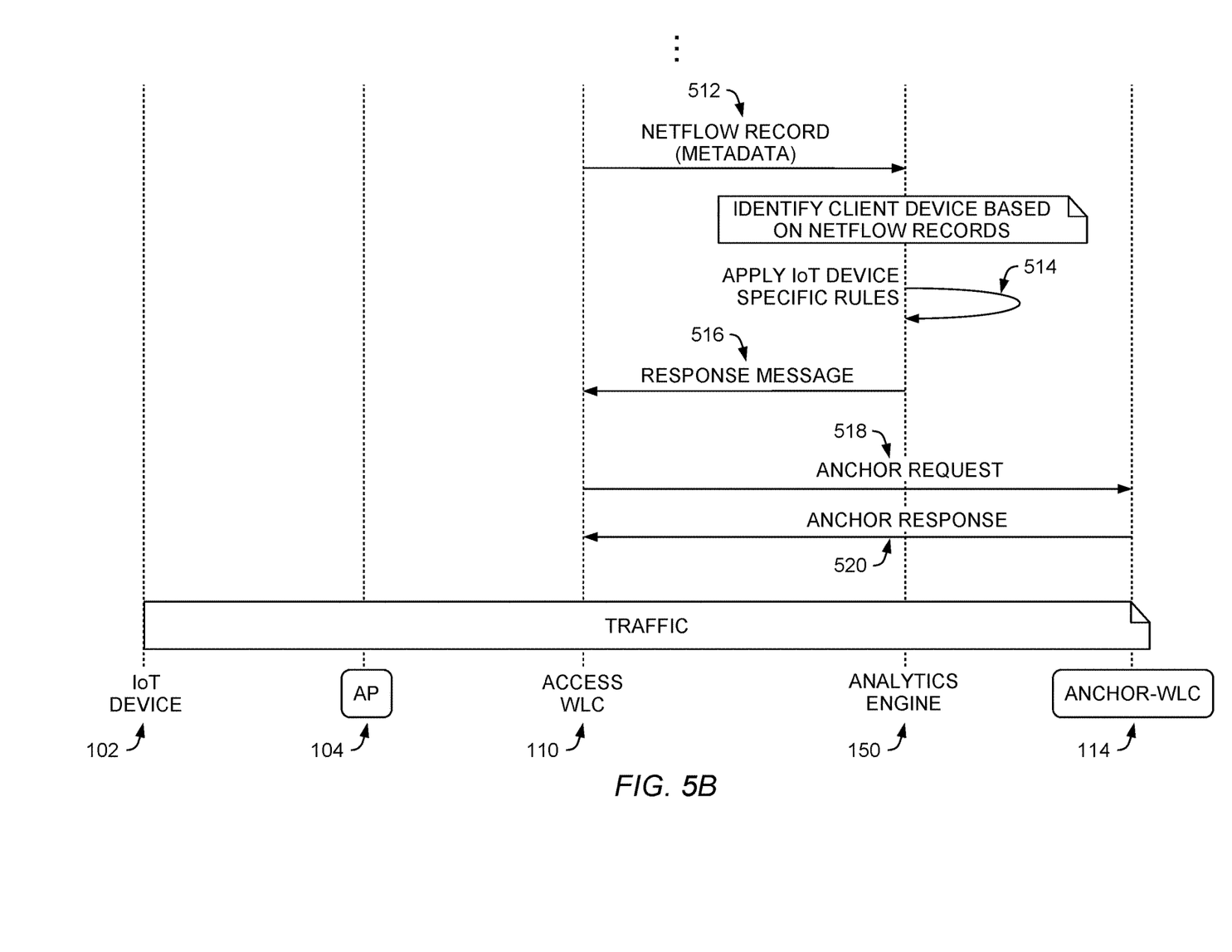

FIGS. 5A and 5B are a further illustration of associating an IoT device with an anchor WLC, according to embodiments. This again shares similarities with the process illustrated in FIG. 3, above, and those details will not be repeated. An IoT device 102 (e.g., IoT device 102a, 102b, or 102c illustrated in FIG. 1) sends an association request message 502 to an AP 104 (e.g., AP 104a or 104b illustrated in FIG. 1). The AP 104 forwards the association request message 504 to the access WLC 110.

The access WLC 110 transmits a netflow record 506 to the analytics engine 150. NetFlow is an existing feature, well known to persons of ordinary skill in the art, that facilitates collection and analysis of IP network traffic. The embodiment illustrated in FIG. 5 can make use of the information provided by the NetFlow feature to trigger anchoring of the IoT device 102 to the anchor WLC 114.

In an embodiment, the netflow record 506 includes metadata related to the IoT device 102 that can be used to identify the type of the IoT device 102. Instead of a device type query 306 and a device type info message 308, as illustrated in FIG. 3, netflow records (e.g., the netflow records 506 and 512 illustrated in FIG. 5) can be repeatedly sent from the access WLC 110 to the analytics engine 150. The analytics engine 150 can use these netflow records 506 and 512 to identify the device type and trigger anchoring.

After the netflow record 506 is sent from the access WLC 110 to the analytics engine 150, the access WLC 110 sends an association response message 508 to the AP 104. The AP 104 sends the association response 510 to the IoT device 102. At this point, the IoT device 102 is still associated with the access WLC 110, and network traffic from the IoT device flows to the access WLC 110.

Another netflow record 512 is sent from the access WLC 110 to the analytics engine 150. The analytics engine 150 identifies the type of the IoT device 102 based on the netflow records 512 and 506. At block 514, the analytics engine 150 applies IoT device specific rules (e.g., triggering anchoring of the IoT device 102 to the anchor WLC 114). The analytics engine 150 sends a response message 516 to the access WLC 110. In an embodiment, this response message 516 can be an existing message type. For example, the response message 516 can be a Change of Authorization (CoA) message or a Re-Authorization Request (RAR) message. Alternatively, the response message 516 can be any suitable message to identify the anchor WLC 114 and trigger anchoring.

The access WLC 110 sends an anchor request message 518 to the anchor WLC 114. The anchor WLC 114 responds by sending an anchor response message 520 to the access WLC. The process proceeds as discussed above with regard to FIG. 3. After the IoT device 102 is associated with the anchor WLC 114, network traffic from the IoT device 102 is tunneled to the anchor WLC 114. Network traffic related to the IoT device 102 can then be managed by a network administrator at the anchor WLC 114.

Figure 6:
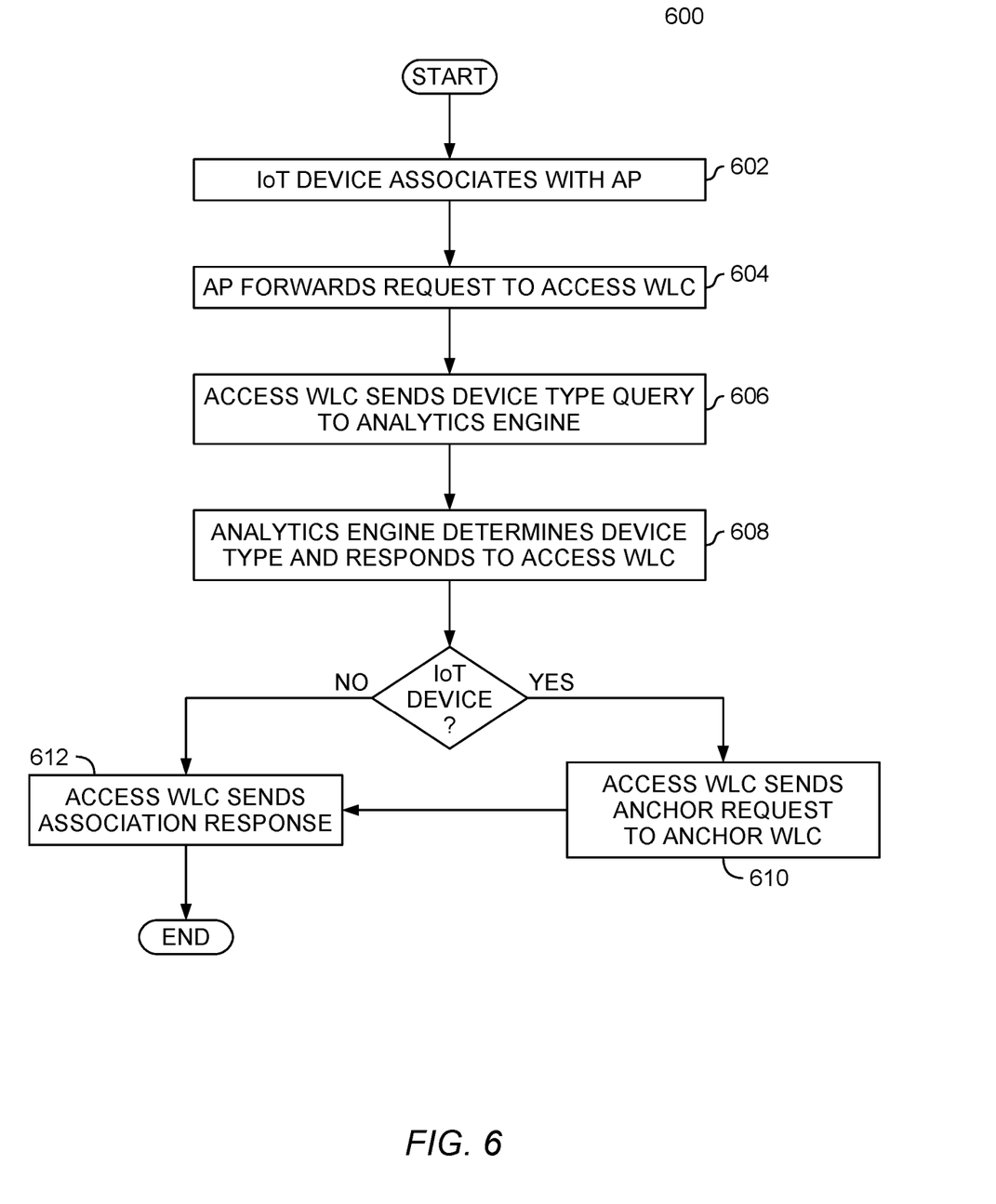
FIG. 6 is a flow chart illustrating associating IoT devices with an anchor WLC, according to embodiments.

FIG. 6 is a flow chart 600 illustrating associating IoT devices with an anchor WLC, according to embodiments. At block 602, an IoT device (e.g., the IoT devices 102a-c illustrated in FIG. 1) associates with an AP (e.g., the APs 104a-b illustrated in FIG. 1). This can be done through a standard process, and is discussed in more detail with regard to FIGS. 3-5, above. At block 604, the AP (e.g., the APs 104a-b illustrated in FIG. 1) forwards the association request to the WLC with which the AP is associated (e.g., the access WLC 110 illustrated in FIG. 1 and FIGS. 3-5). This is again discussed in more detail with regard to FIGS. 3-5.

At block 606, the access WLC (e.g., the access WLC 110) sends a device type query (e.g., device type query 306 or 406). This is discussed in more detail with regard to FIGS. 3 and 4. At block 608, the analytics engine (e.g., the analytics engine 150) determines the type of the IoT device and sends a response to the access WLC. This is again discussed in more detail with regard to FIGS. 3 and 4.

If the device is an IoT device, at block 610 the access WLC sends an anchor request (e.g., the anchor request 310, 420, or 518) to the anchor WLC (e.g., the anchor WLC 114). The flow then proceeds to block 612, and the access WLC sends an association response (e.g., the association response 316) to the AP, which forwards the association response to the IoT device. If the device is an IoT device, it will then be associated with the anchor WLC, and network traffic from the IoT device will flow to the anchor WLC.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the analytics engine 150) or related data available in the cloud. For example, the analytics engine 150 could execute on a computing system in the cloud and identify the device type for the IoT device 102. In such a case, the analytics engine 150 could include a device profiling database 270 at a storage location in the cloud, and the device type response module 262 could operate in the cloud to query the device profiling database 270. Doing so access to the analytics engine 150 from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for anchoring a wireless device to a wireless controller, the method comprising:
   receiving a network message related to a network device at a first wireless local area network (LAN) controller (WLC);
   generating a device type query message based on the network message;
   determining that the network device comprises an Internet of Things (IoT) device, based on transmitting the device type query message from the first WLC to an analytics engine;
   determining, based on the determination that the network device comprises an IoT device, that the network device should be anchored to a pre-determined anchor WLC for IoT devices;
   transmitting an anchor request message from the first WLC to the pre-determined anchor WLC; and
   establishing a network traffic tunnel between the network device and the pre-determined anchor WLC such that network traffic from the network device can be controlled by the pre-determined anchor WLC.

2. The method of claim 1, further comprising:
   receiving, at the first WLC from the analytics engine, a response message identifying the device type of the network device as an IoT device type; and
   receiving, at the first WLC, an anchor response message from the pre-determined anchor WLC.

3. The method of claim 1, further comprising:
   receiving, at the first WLC, an association request related to the network device, and in response transmitting the device type query message to the analytics engine.

4. The method of claim 1, further comprising:
   monitoring, at the first WLC, network traffic relating to the network device, wherein the device type query message is transmitted based on the monitoring.

5. The method of claim 1, wherein the device type query message is a Remote Procedure Call (RPC) message.

6. The method of claim 1, further comprising:
   receiving one or more netflow records from the first WLC at an analytics engine; and
   based on the one or more netflow records, identifying the device type of the network device, and in response transmitting a response message to the first WLC, wherein the response message is configured to trigger the anchor request message from the first WLC to the pre-determined anchor WLC.

7. The method of claim 1, further comprising:
   identifying a second device type of a second network device based on data included in a second network message;
   determining, based on the identified second device type, that the second network device should be anchored to the pre-determined anchor WLC;
   establishing a second network traffic tunnel between the second network device and the pre-determined anchor WLC such that network traffic from the second network device can be controlled by the pre-determined anchor WLC.

8. The method of claim 1, wherein establishing a network traffic tunnel between the network device and the pre-determined anchor WLC further comprises establishing, at the first WLC, the tunnel to the pre-determined anchor WLC, such that network traffic from the network device flows through the tunnel to the pre-determined anchor WLC.

9. The method of claim 1, wherein the determining that the network device comprises an IoT device further comprises:
   receiving a device type response at the WLC from the analytics engine, wherein the analytics engine generates the device type response by parsing metadata included in the device type query and querying a device profiling database; and
   parsing the device type response at the WLC to determine that the network device comprises the IoT device.

10. A computer program product for anchoring a wireless device to a wireless controller, the computer program product comprising:
    a non-transitory computer-readable storage medium having computer-readable program code embodied therewith, wherein the code, when executed by a processor, performs an operation, the operation comprising:
       receiving a network message related to a network device at a first wireless local area network (LAN) controller (WLC);
       generating a device type query message based on the network message;
       determining that the network device comprises an Internet of Things (IoT) device, based on transmitting the device type query message from the first WLC to an analytics engine;
       determining, based on the determination that the network device comprises an IoT device, that the network device should be anchored to a pre-determined anchor WLC for IoT devices;
       transmitting an anchor request message from the first WLC to the pre-determined anchor WLC; and
       establishing a network traffic tunnel between the network device and the pre-determined anchor WLC such that network traffic from the network device can be controlled by the pre-determined anchor WLC.

11. The computer program product of claim 10, the operation further comprising:
    receiving, at the first WLC from the analytics engine, a response message identifying the device type of the network device as an IoT device type; and
    receiving, at the first WLC, an anchor response message from the pre-determined anchor WLC.

12. The computer program product of claim 10, the operation further comprising:
    receiving, at the first WLC, an association request related to the network device, and in response transmitting the device type query message to the analytics engine.

13. The computer program product of claim 10, the operation further comprising:
    monitoring, at the first WLC, network traffic relating to the network device, wherein the device type query message is transmitted based on the monitoring.

14. The computer program product of claim 10, the operation further comprising:
    receiving one or more netflow records from the first WLC at an analytics engine; and
    based on the one or more netflow records, identifying the device type of the network device, and in response transmitting a response message to the first WLC, wherein the response message is configured to trigger the anchor request message from the first WLC to the pre-determined anchor WLC.

15. The computer program product of claim 10, wherein establishing a network traffic tunnel between the network device and the pre-determined anchor WLC further comprises establishing, at the first WLC, the tunnel to the pre-determined anchor WLC, such that network traffic from the network device flows through the tunnel to the pre-determined anchor WLC.

16. A system, comprising:
a processor; and
a memory storing a program, which, when executed on the processor, performs an operation, the operation comprising:
receiving a network message related to a network device at a first wireless local area network (LAN) controller (WLC);
generating a device type query message based on the network message;
determining that the network device comprises an Internet of Things (IoT) device, based on transmitting the device type query message from the first WLC to an analytics engine;
determining, based on the determination that the network device comprises an IoT device, that the network device should be anchored to a pre-determined anchor WLC for IoT devices;
transmitting an anchor request message from the first WLC to the pre-determined anchor WLC; and
establishing a network traffic tunnel between the network device and the pre-determined anchor WLC such that network traffic from the network device can be controlled by the pre-determined anchor WLC.

17. The system of claim 16, the operation further comprising:
receiving, at the first WLC from the analytics engine, a response message identifying the device type of the network device as an IoT device type; and
receiving, at the first WLC, an anchor response message from the pre-determined anchor WLC.

18. The system of claim 16, the operation further comprising:
receiving, at the first WLC, an association request related to the network device, and in response transmitting the device type query message to the analytics engine.

19. The system of claim 16, the operation further comprising:
monitoring, at the first WLC, network traffic relating to the network device, wherein the device type query message is transmitted based on the monitoring.

20. The system of claim 16, the operation further comprising:
receiving one or more netflow records from the first WLC at an analytics engine; and
based on the one or more netflow records, identifying the device type of the network device, and in response transmitting a response message to the first WLC, wherein the response message is configured to trigger the anchor request message from the first WLC to the pre-determined anchor WLC.

* * * * *